Aug. 9, 1938.  A. W. SWENSON  2,126,153
STALK LIFTER
Filed Sept. 28, 1936  2 Sheets-Sheet 1
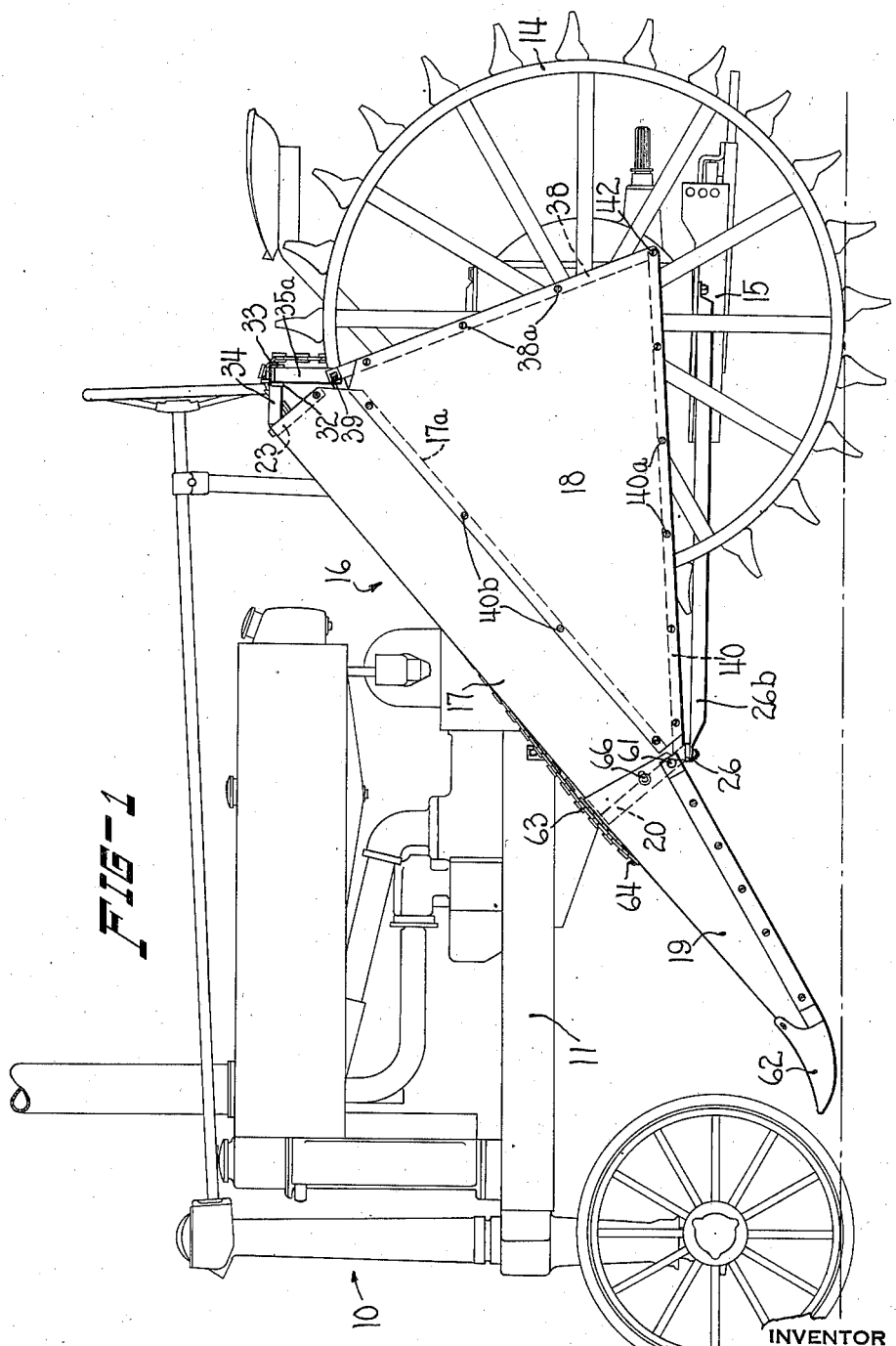
INVENTOR
Axel W. Swenson.
BY
ATTORNEYS.

Aug. 9, 1938.   A. W. SWENSON   2,126,153
STALK LIFTER
Filed Sept. 28, 1936   2 Sheets-Sheet 2
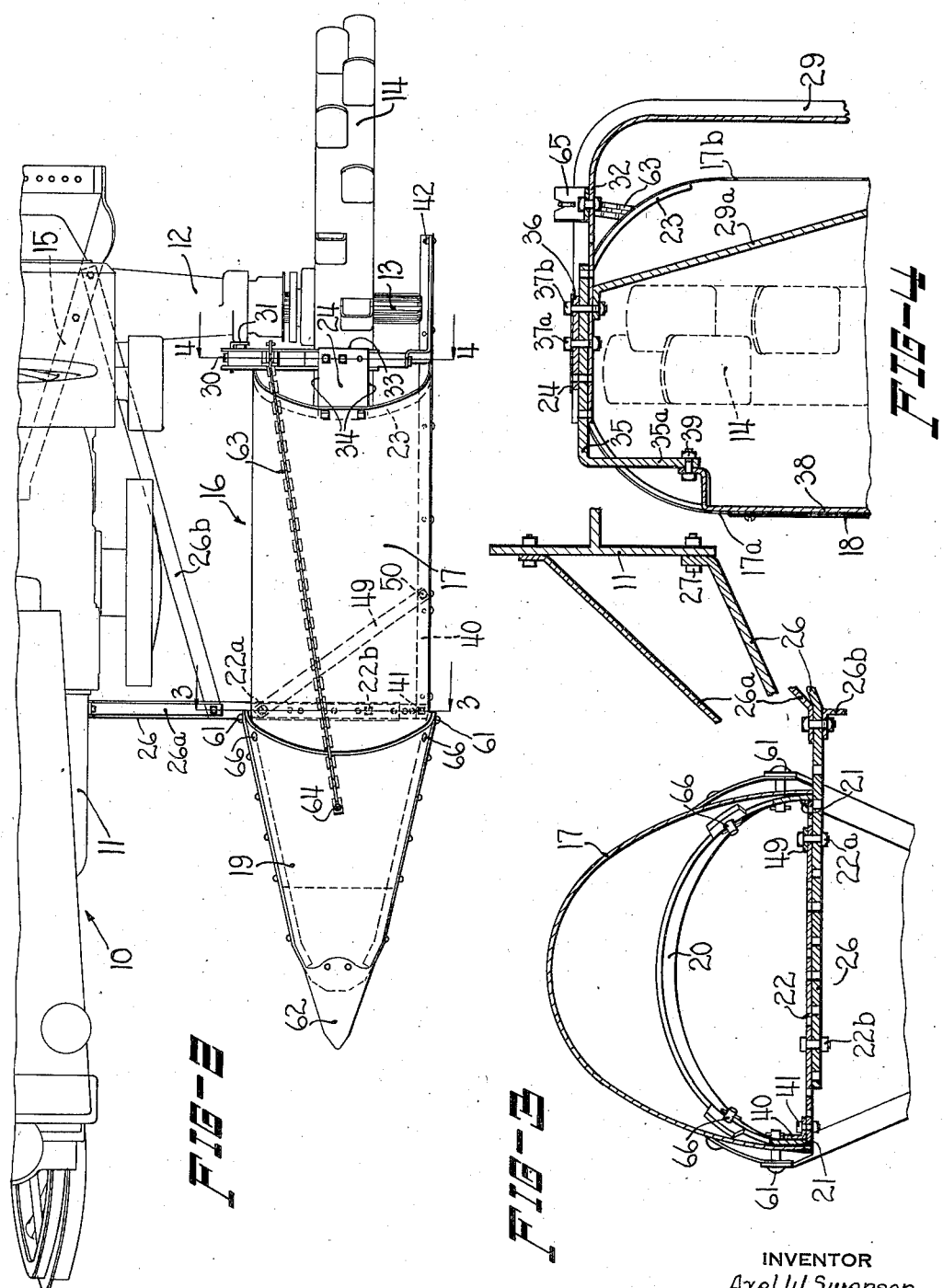
INVENTOR
Axel W. Swenson.
BY
ATTORNEYS.

Patented Aug. 9, 1938

2,126,153

UNITED STATES PATENT OFFICE 2,126,153

STALK LIFTER

Axel W. Swenson, Moline, Ill., assignor to Deere & Company, Moline, Ill., a corporation of Illinois Application September 28, 1936, Serial No. 102,939

8 Claims. (Cl. 280—160)

This invention relates to a stalk lifter shield adapted to be applied to a tractor to prevent damage to blown-down corn stalks in the path of the rear drive wheel of the tractor.

It is an object of this invention to provide a stalk lifter shield adapted to substantially overlie the leading tread portion of the driving wheel, including tractor attaching means cooperating with the shield, by which the latter may be quickly attached to or detached from the tractor.

Another object is the provision of a stalk lifter shield with adjustable tractor-attaching means to accommodate lateral adjustment of the associated rear wheel.

Another object is the provision of a stalk lifter shield which may be disposed on either side of a tractor so as to be adaptable for use irrespective of whether the harvester to be drawn by the tractor is designed to operate on rows on the right hand side of the tractor or on rows on the left hand side.

Other objects and advantages of this invention will be apparent to those skilled in the art, after a consideration of the following detailed description, taken in conjunction with the accompanying drawings, wherein is shown one embodiment of this invention as applying to a tractor.

Figure 1 is a side elevation view of a tractor equipped with a stalk lifter shield constructed and attached in accordance with this invention;

Figure 2 is a fragmentary top plan view of the structure shown in Figure 1;

Figure 3 is a fragmentary section taken substantially on line 3—3 of Figure 2; and, Figure 4 is a fragmentary section taken on line 4—4 of Figure 2.

As shown in the drawings, the tractor upon which the present stalk lifter is mounted is indicated generally by reference numeral 10, and comprises a longitudinal frame 11 and a rear axle housing 12, in which drive axles 13 are journaled, and which at their outer ends adjustably carry rear traction wheels 14. Drawbar 15 is carried on the rear end of frame 12.

The lifter, designated as 16, comprises a transversely curved downwardly and forwardly inclined fender portion 17, a flat shield portion 18, and a floating shoe structure 19, all of sheet metal construction. The front end of fender portion 17 is fixed to a framework comprising an arched member 20, welded at 21 to the outer ends of a perforated cross-member 22. A similar arched member 23 is fastened to the rear end of fender portion 17. The central portion of member 23 is flattened to provide a seating surface for a flat rearwardly extending bracket 24, bolted to the member 23.

The fender portion 17 is mounted on the tractor by attaching means cooperating with cross-member 22 at the front end of the fender portion 17, and separate attaching means cooperating with the bracket 24 at the rear end of fender portion 17. The front attaching means comprises a bar 26, rigidly secured by bolt 27 to the frame 11 of the tractor, and projecting laterally to present a flat surface on which the cross-member 22 is adapted to be seated. Member 22 and bar 26 are provided with a plurality of perforations, in selected ones of which bolts 22a and 22b are disposed. Bar 26 is braced by means of an upwardly and inwardly extending brace 26a fixed to the frame of the tractor, and a rearwardly and inwardly extending brace 26b connected at its rear end to the drawbar 15 of the tractor.

The rear attaching means comprises a vertical channel member 29, fixed at its lower end by bolts 30 to a bracket 31 mounted on the rear axle housing 12. At its upper end member 29 is bent laterally to provide a transverse support 32, spaced upwardly from the upper limits of the rear wheel 14, on which the bracket 24 is seated. At its rear end bracket 24 is provided with a lip 33, formed by bending its rear edge downwardly, and with shoulders 34 formed by bending the sides of the bracket downwardly, which lip and shoulders define a transverse recess in which support 32 is engageable. Support 32 is positioned with its side flanges extending upwardly. Disposed in the channel between the side flanges is an extension member 35 and a filler plate 36, both of which are provided with a plurality of perforations positioned to register with selected ones of a plurality of perforations in the bracket 24 and the support 32 to receive bolts 37a and 37b. Bolt 37b also serves to fasten an inwardly extending brace 29a for support 32. The lower end of brace 29a is fixed to bracket 31.

Member 35 is provided with a downwardly extended portion 35a, from which a bar 38 is suspended by bolt 39. An angle iron member 40, connected at its front end by bolt 41 to the outer end of cross-member 22, is attached by a bolt 42 to the lower end of bar 38. Bolt 22a at the inner end of member 22 also serves to fasten the forward end of a diagonal brace 49, secured at its rear end by bolt 50 to the rearwardly extending portion of angle member 40. The lower edge and the rear edge of side shield 18 are respectively removably fixed to member 40 by bolts 40a and to bar 38 by bolts 38a. The upper edge of shield 18 is removably fixed to the outer edge 17a of fender portion 17 by bolts 40b.

The floating shoe 19 is pivotally supported on the front end of the fender portion 17 by pivot pins 61, which allows the shoe to swing vertically with respect to the shield to accommodate variations in ground contour. An adjustable connection, whereby the front end of the shoe can be raised or lowered to adjust the operating position of a ground-engaging point 62 carried at the leading end of the shoe, is provided. This adjustable connection comprises a chain 63, fixed at 64 to the central portion of the shoe 19. At its upper end chain 63 selectively engages a clip 65 mounted on support 32. Pivotal movement of the shoe is limited by a lost motion bolt and slot connection 66. Thus the chain 63 constitutes means for controlling downward pivotal movement of the shoe within limits of the lost motion connection while it permits limited upward pivotal movement of the shoe.

Changes in position of wheel 14 on axle 13 may be accommodated by merely removing bolts 22a and 22b, and 37a and 37b, then moving the stalk lifter laterally into the proper position, and then reinserting the bolts in other aligned holes in the supporting members.

In the drawings the stalk lifter is shown mounted on the left side of the tractor. To mount it on the right side, support 26 with braces 26a and 26b and member 29 are connected to the tractor on the right side thereof, and shield 18 is bolted along the edge 17b of fender portion 17, which is now the outer edge, edge 17b being provided with holes spaced similarly to the holes in the upper edge of shield 18, the same as edge 17a. Member 40 and bar 38 are also bolted on the opposite side of shield 18 from that shown in the drawings to dispose them on the inside of the shield. Member 40 is bored with similarly spaced holes in both flanges as shown so that either flange may be used as the attaching flange, and so may be disposed with a horizontal flange extending inwardly from the lower edge of a vertical flange in either position of the stalk lifter.

What I claim as my invention is:—

1. The combination with a tractor having a laterally adjustable rear driving wheel, of a grain stalk lifter mounted on the tractor and extending upwardly and rearwardly from its front end, its rear end overlying said wheel, a cross-member near the front end of the lifter, a bracket fixed to the rear end of the lifter, and means for mounting said member and bracket on the tractor comprising two longitudinally spaced supports extending laterally from the tractor and on which said member and bracket are respectively seated, said bracket, cross-member and supports each having a plurality of transversely spaced perforations through which bolts may be passed to secure the lifter in any one of a plurality of different lateral positions to accommodate lateral adjustments of said wheel.

2. The combination with a tractor having a laterally adjustable rear driving wheel, of a grain stalk lifter mounted on the tractor and extending upwardly and rearwardly from its front end, its rear end overlying said wheel, said lifter comprising a fender, a cross-member near the front end of the fender, a bracket fixed to the rear end of the fender, and means for mounting said member and bracket on the tractor comprising two longitudinally spaced supports extending laterally from the tractor and on which said member and bracket are respectively seated, said bracket, cross-member and supports each having a plurality of transversely spaced perforations through which bolts may be passed to secure the fender in any one of a plurality of different lateral positions to accommodate lateral adjustments of said wheel, a ground-engaging shoe pivotally connected to the front end of the fender, and adjusting mechanism connecting the shoe with the rear support and operable to vary the position of the shoe relative to the ground.

3. The combination with a tractor having a laterally adjustable rear driving wheel, and including a rear axle housing, of a grain stalk lifter mounted on the tractor and extending upwardly and rearwardly from its front end to dispose its rear end over said wheel, comprising a fender portion, a side portion and a floating shoe structure adjustably carried by the front end of the fender portion, a frame on which the front end of the fender portion is mounted, a bracket fixed to the rear end of said fender portion, means for attaching said fender portion to the tractor comprising a support extending laterally from the tractor forwardly of said wheel, means for fixing said frame to said support at any one of several laterally spaced positions, a vertical member fixed at its lower end to the rear axle housing and terminating at its upper end in a transverse support extending over said wheel, and means for fixing said bracket to said transverse support at any one of several laterally spaced positions to accommodate lateral adjustments of said wheel.

4. The combination with a tractor having a driving axle and a pair of supporting wheels mounted thereon and positioned on opposite sides of the tractor, of a stalk lifter comprising a fender substantially semi-circular in cross-section, means for mounting said fender over the supporting wheel on either side of the tractor with the two edges thereof depending on opposite sides of the wheel, a detachable side shield for the fender adapted to extend downwardly past the outer end of said driving axle, each edge of said fender being adapted to have said shield fixed thereto, and means for removably attaching said shield to either side of said fender, whereby said shield may be fixed to said fender adjacent the outside of the wheel in either position in which the fender is mounted.

5. A grain stalk lifter for a vehicle wheel, comprising a fender adapted to embrace the forward portion of said wheel, a forwardly extending shoe pivotally supported on said fender for vertical swinging movement, a bracket attached to said fender, a support adapted for attachment to said vehicle for receiving said bracket in different positions of adjustment laterally with respect to said vehicle, and means for rigidly securing said bracket to said support in any of said positions of lateral adjustment.

6. A grain stalk lifter for a vehicle wheel, comprising a fender adapted to embrace the forward portion of said wheel, a forwardly extending shoe pivotally supported on said fender for vertical swinging movement, means for adjustably limiting the extent of downward movement of said shoe relative to the ground, a bracket attached to said fender, a support adapted for attachment to said vehicle for receiving said bracket in different positions of adjustment laterally with respect to said vehicle, and means for rigidly securing said bracket to said support in any of said positions of lateral adjustment.

7. A grain stalk lifter for a vehicle wheel, comprising a fender adapted to embrace a portion of the periphery of said wheel and to extend forwardly therefrom, reversible supporting means for mounting said fender on either side of said vehicle, a removable side shield adapted to extend from said fender parallel to the vehicle wheel, adjacent the outer side of the latter and through the axis of rotation thereof, and means for fastening said shield on either side of said fender, selectively, depending on which side of the latter is positioned outwardly of the wheel.

8. A grain stalk lifter for a vehicle wheel, comprising a fender adapted to embrace a portion of the periphery of said wheel and to extend forwardly therefrom, a forwardly extending shoe pivotally supported on said fender for vertical swinging movement, reversible supporting means for mounting said fender on either side of said vehicle, a removable side shield adapted to extend from said fender parallel to the vehicle wheel adjacent the outer side of the latter, and means for fastening said shield on either side of said fender, selectively, depending on which side of the latter is positioned outwardly of the wheel.

AXEL W. SWENSON.